Sept. 12, 1967      R. G. BRYER      3,341,761

DOSIMETER CHARGING APPARATUS

Filed Oct. 7, 1963      3 Sheets-Sheet 1

INVENTOR
ROBERT GEORGE BRYER
BY Hane and Nydick
ATTORNEYS

United States Patent Office 3,341,761
Patented Sept. 12, 1967

3,341,761
DOSIMETER CHARGING APPARATUS
Robert G. Bryer, Ruislip, England, assignor to R. A. Stephen & Company Limited, Mitcham, Surrey, England, a British company
Filed Oct. 7, 1963, Ser. No. 314,286
Claims priority, application Great Britain, Oct. 9, 1962, 38,158/62
10 Claims. (Cl. 320—1)

ABSTRACT OF THE DISCLOSURE

A connector for connecting dosimeters having different contact dimensions and locations to a voltage source for charging the connected dosimeter.

This invention relates to electric supply and connecting apparatus, and is principally concerned with an apparatus of this kind which is suitable for charging dosimeters. Certain types of dosimeters, such as those of the quartz fibre type, require to be periodically connected to a source of relatively high voltage, and an apparatus for this purpose should be simple and effective in operation.

One of the difficulties of providing a suitable apparatus of this kind is due to the fact that there are numerous types of dosimeters which present different terminal arrangements of the connections to which the charging voltage is to be applied. The present invention concerns an apparatus which can be used with a variety of dosimeters made in accordance with the present designs or standards.

According to the present invention, there is provided an electric supply and connecting apparatus fore charging dosimeters comprising connector means including a first contact, a second sleeve-like contact surrounding said first contact and insulated therefrom, spring means for biasing one of said contacts to a limit position, and means for supplying a charging voltage to one or both contacts when said one contact is moved against its bias by the dosimeter contacts.

Features and advantages of the invention will appear from the following description of one embodiment thereof, given by way of example, in conjuncion with the accompanying drawings, in which.

Figure 1:
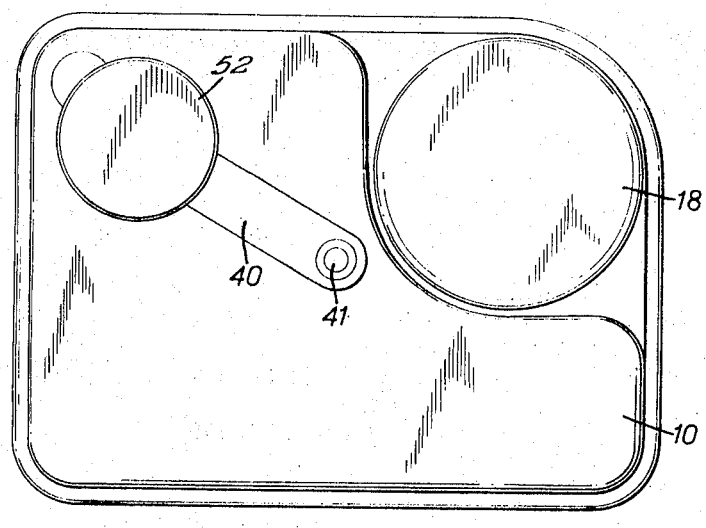
FIGURE 1 is a top view of a dosimeter charging apparatus.
Figure 2:
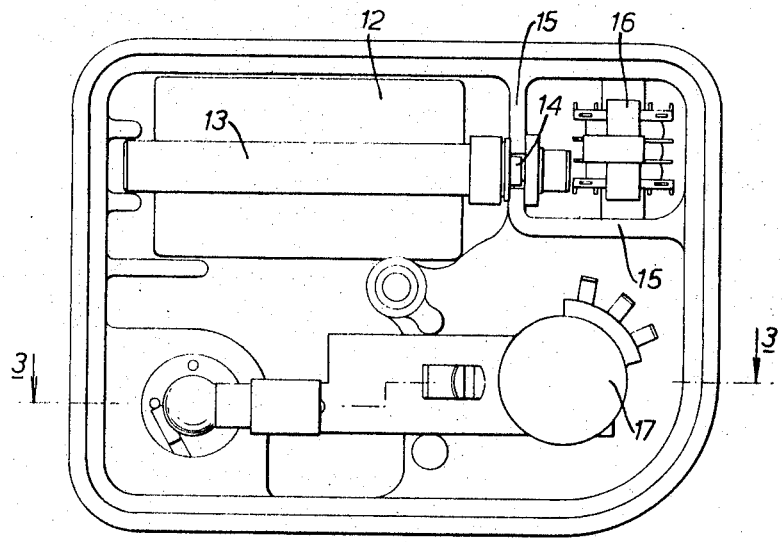
FIGURE 2 is a bottom view, with the base removed, of the apparatus of FIGURE 1.
Figure 3:
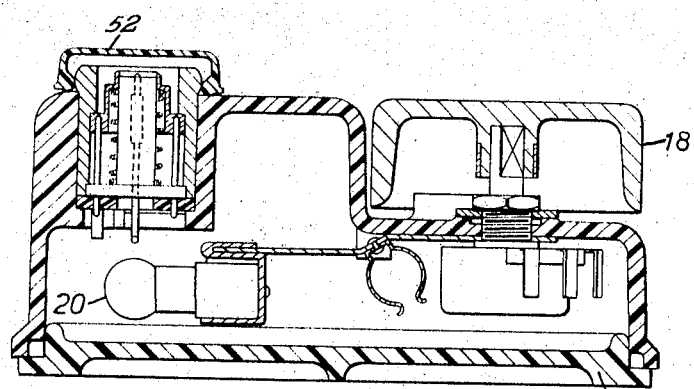
FIGURE 3 is a section taken on the line 3—3 of FIGURE 2.

The apparatus shown comprises a casing 10, suitably of moulded or cast material, the bottom of which is closed by a fitting base 11, secured in position by means of a central screw, not shown. This casing accommodates a small primary cell, means for stepping the voltage of the cell up to appropriate value, and a connector by which, when the dosimeter is offered to the charging apparatus, voltage is generated and fed to the dosimeter. Means are also provided for controlling the voltage produced.

The primary cell is positioned at 12, and contacts 13 and 14 are provided to engage the cell terminals. Of these contacts the latter is supported in a wall 15, formed integrally with casing 10, and providing a small compartment for a transistor oscillator assembly indicated generally at 16. This assembly includes a coil by means of which a stepped-up voltage is obtained, which is then rectified by a small rectifier forming part of the assembly. The voltage produced can be controlled by means of a variable resistor 17, controllable by means of a control knob 18 arranged externally of the casing; as shown, the casing is recessed to receive the knob, to provide a compact structure, free from projections. A lamp bulb 20 is also arranged within the casing 10.

The controlled high voltage produced is fed to a connector which is externally accessible on the casing, and which is adapted to have a dosimeter applied to it to be charged. The construction of the connector is shown in more detail in FIGURE 4. It comprises a central body 21 of transparent insulating material, which supports a central contact 22, conveniently moulded within the body, and connected to the high voltage. The end of contact 22 projects slightly from the upper face of body 21. The body is of circular cross section and is surrounded by a shaped sleeve 23 of conducting material, which can slide upon the surface of the body. Accordingly, the upper part of the sleeve has an internal diameter which fits on the body, while its outer, and also cylindrical, surface has an end portion of reduced cross-sectional area to provide portions 24 and 25 that are of different external diameters. The sleeve is biased upwardly by a helical spring 26 that surrounds the body 21, the spring bearing at one end against the sleeve and at the other end against a flange 27 formed integrally with the body 21. The sleeve 23 carries two pins 30, 31 of conductive material, the pins extending both through openings in the flange 27, and also in an insulating disc 33, disposed below flange 27, and being of slightly greater diameter; the diameter of disc 33 is such as to fit snugly within a cylindrical recess 34 formed in the casing. A metallic cylindrical plug 35 fits in the recess 34, and has a shoulder 36 which acts as a stop to limit the upward movement of the sleeve 23. The sleeve can be pressed downwardly, thereby to cause pins 30 and 31 to move with it, and one or both of these pins is arranged to make contact to a leaf spring contact 37, (see FIG. 4) of switch 42; the contact or contacts thus made are used to switch the supply to the transistor oscillator.

Figure 4:
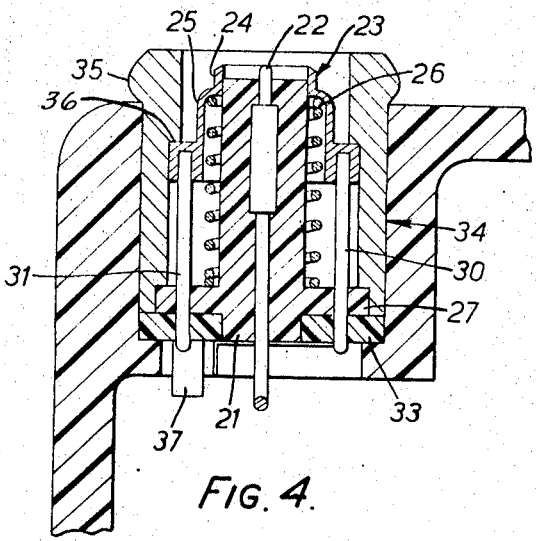
FIGURE 4 is an enlarged partial view of the connector.
Figure 5:
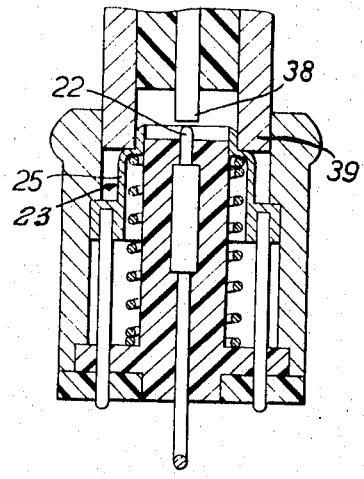
FIGURE 5 shows, in enlarged partial view, a dosimeter.
Figure 5A:
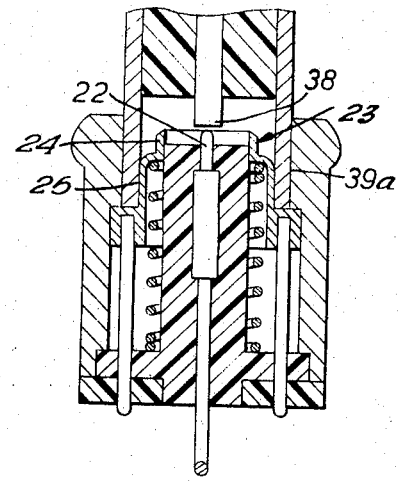
FIGURE 5a shows, in enlarged partial view, a similar dosimeter, but having different contact dimensions in contact with the connector.

In the normal position, and as shown in FIGURE 4, the upper cylindrical edge of sleeve 23 projects slightly above the upper surface of the body 21. A dosimeter having an inner contact 38 surrounded by a tubular contact member 39 can be applied to the sleeve 23 so as to engage or surround the surface 24 or the surface 25. In FIG. 5, member 39 engages contact surface 24 and in FIG. 5a a similar but differently shaped contact member 39a engages contact surface 25. In this way, the apparatus can be used with a variety of dosimeter sizes and connections; in each case pressure applied to make the desired connection is used for the switching operation of the transistor supply, and for lighting lamp 20 from which light passes through the transparent body 21 to illuminate the interior of the dosimeter.

To prevent the entrance of dirt or moisture to the connector terminals, a removable cap 52 is provided; this may be of moulded plastic material, formed with a flexible extension 40, and attached to the casing by means of a pin or rivet at 41. The cap is a snap fit on the plug member 35, which is suitably shaped at its periphery to form a projection over which the cap can fit, and the cap is held captive upon the casing so that it will not become lost.

Figure 6:
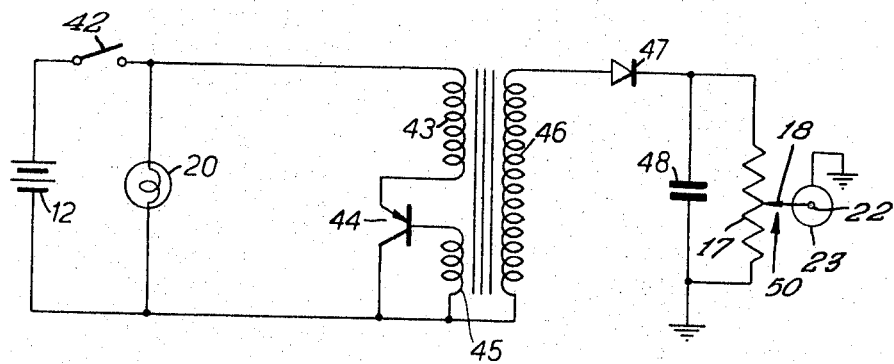
FIGURE 6 is a circuit diagram of the charging apparatus.

Referring to FIGURE 6, the operation of the dosimeter charging apparatus is as follows:

On closing a switch 42, the lamp 20 and oscillator circuits are connected to battery 12 and a small current will pass through a transformer primary 43 via the collector-emitter path of a transistor 44. This will induce a current in the secondary winding 45 which is connected to the base of the transistor in such a sense that passage of this current through the base-emitter path renders the transistor more conducting. This process continues until nearly all the battery voltage appears across the primary of the transformer, and no further change is possible. At this stage, the primary current also ceases to change, causing the induction process in the base winding to cease. The cessation of forward bias to the transistor base, due to this cause, makes the transistor change immediately from the highly conductive state, to the initial, poorly conducting state. The collector current is thus suddenly reduced, and the magnetic field which had been created in the transformer by the passage of current, up to this point of time, now collapses, and in so doing, induces a reversed voltage in the base winding which "cuts-off" the transistor completely. When the magnetic field reaches zero, the transistor-base once again has no voltage impressed on it. This is identical with the initial condition and the cycle starts again. The repetition rate is, for example, about 2000 times per second.

The time taken for the magnetic field to collapse is much shorter than the time taken to establish it, since with the transistor cut-off the impedances across the transformer are much higher than with the transistor conductive.

As the magnitude of induced voltage is proportional to the rate of change of magnetic flux the reverse voltages developed across the windings are thus higher than the forward voltages, and in inverse proportion to the duration times of conducting and cut-off strokes. This feature is used to reduce the turns ratio between primary 43 and HT secondary 46 for a given output voltage.

The HT secondary 46 is connected via a metal rectifier 47 to a reservoir capacitor 48 and the voltage control 50 of which control knob 18 is a part. From the preceding paragraph it will be seen that the rectifier is arranged to conduct when the transistor is cut-off, and to isolate the HT circuit whilst the transistor conducts.

The reservoir capacitor will discharge slowly via the load resistor 17 of control 50 and will have its charge replenished each time the transistor cuts-off, the voltage across it rising and falling slightly at the frequency of the oscillations. By suitable component values, the loss of charge (hence fall of voltage) during the transistor conduction cycle is kept to a minimum.

The motion of the voltage control is restricted at the clockwise end of its travel by an "early" stop thus retaining a small output voltage with the control at minimum.

The battery connectors are arranged so that connection can only be made in the correct polarity.

I claim:
1. An electric connecting apparatus for connecting a dosimeter having an outer, generally cylindrical, contact and an inner contact within the outer contact and having an exposed contact surface spaced inwardly from the end edge of the outer contact to a voltage supply means for charging the dosimeter, said apparatus comprising in combination: connector means including a first contact means defining an inner contact surface for engaging the inner dosimeter contact; a second contact means surrounding, and being insulated from, said first contact means and defining outer contact surfaces for engaging the outer dosimeter contact, said outer contact surfaces being spaced in a direction radially of said inner contact surface and being arranged to accommodate dosimeter contacts of different dosimeters in which the spacing between the contact surface of the inner contact and the end edge of the outer contact is different; means for biasing said first and second contact means to a first relative position; and means adapted to operate, when said first and second contact means are moved toward a different relative position upon insertion of the dosimeter contacts into connector means for connecting said first and second contact means to a voltage supply means for supplying a charging voltage across said contact means.

2. Apparatus according to claim 1, wherein said second contact means has a free-end portion of reduced diameter.

3. Apparatus according to claim 1, wherein said first contact means is embedded in body of insulating material, and wherein said second contact means is free to slide upon an outer surface of said body and a coil spring surrounding said body biases said second contact means toward a predetermined position in reference to said first contact means.

4. Apparatus according to claim 1, wherein one of said contact means has a switching means for switching the voltage supply means to said contacts.

5. Apparatus according to claim 4, wherein said switching means includes at least one elongate member attached to said one contact means and adapted to make contact with a movable contact of a switch in circuit with said voltage supply means.

6. A voltage supply for an apparatus as defined in claim 1, said voltage supply means including a source of direct current, and means for stepping up the output voltage of said source.

7. Apparatus according to claim 6, wherein said stepping-up means includes an oscillator, the output of which is rectified.

8. Apparatus according to claim 6, wherein said direct current source is a primary cell.

9. Apparatus according to claim 6 and comprising impedance means for controlling the output of said voltage supply means.

10. Apparatus according to claim 9, wherein said impedance means is a variable resistor.

References Cited

UNITED STATES PATENTS

| | | | |
|---|---|---|---|
| 2,751,544 | 6/1956 | Stirnkorb | 320—1 |
| 2,770,765 | 11/1956 | Negus | 320—1 |
| 2,944,204 | 7/1960 | Herbert | 320—1 |
| 3,193,749 | 7/1965 | Grimm et al. | 320—1 |
| 3,231,706 | 1/1966 | Waldorf | 200—167 |

FOREIGN PATENTS 784,315   10/1957   Great Britain.

OTHER REFERENCES

"Family Radiation Measurement Kit," Heath Company, 1962, (250–83.3PD).

BERNARD KONICK, *Primary Examiner.*

J. BREIMAYER, *Assistant Examiner.*